UNITED STATES PATENT OFFICE.

BENNO HOMOLKA, OF FRANKFORT-ON-THE-MAIN, AND JOSEF ERBER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

COMPOUND OF ORGANIC COLORS WITH FATTY ACIDS AND PROCESS OF MAKING SAME.

No. 839,590. Specification of Letters Patent. Patented Dec. 25, 1906.

Application filed April 12, 1906. Serial No. 311,206

*To all whom it may concern:*

Be it known that we, BENNO HOMOLKA, Ph. D., chemist, residing at Frankfort-on-the-Main, and JOSEF ERBER, Ph. D., chemist, residing at Höchst-on-the-Main, Germany, citizens of the Empire of Germany, have invented certain new and useful Improvements in the Manufacture of Products Soluble in Water, Fats, and Oils from the Sebates and Oleates of Organic Color Bases, of which the following is a specification.

The sebates and oleates of organic color bases are known to be insoluble in water. They are obtained by double decomposition of the color bases with sebacic or oleic acids or by the reaction of the different dyestuffs as salts soluble in water with alkali sebates or oleates—for instance, with soap. They have been in use for a long time for coloring fats and oils. Modern coloring industry, however, requires the sebates and oleates of organic color bases to be not only soluble in fats and oils, but also in water. We have found that products having such properties may be obtained by means of the alkali salts of benzyl-anilin sulfonic acid or its homologues. If, for instance, the sebate or oleate of a dyestuff insoluble in water be introduced while heating into a considerably-concentrated solution of alkali-benzyl-anilin sulfonate of about thirty per cent. strength, it dissolves in great quantities. This solution may be further diluted with water as desired and is also homogeneously miscible with fats, oils, and varnishes, but is insoluble in ether. Owing to this behavior it is particularly suited for certain coloring purposes—for instance, to shade off printing-inks.

Example 1: Twenty-three parts of the hydrochlorid of methyl-violet 6 B are stirred together with fifteen parts of soft soap, whereby the sebate insoluble in water is obtained. There is then added while stirring and heating a concentrated aqueous solution of ten parts of alkali-benzyl-anilin sulfonate $(C_6H_5-CH_2-NH-C_6H_4-SO_3Na)$ or of 10.5 parts of alkali-benzyl-toluidin $(C_6H_5-CH_2NH-C_7H_6-SO_3Na)$ or of eleven parts of alkali-benzyl-xylidin sulfonate $(C_6H_5-CH_2-NH-C_8H_8-SO_3Na)$ until the product obtained becomes soluble in water. The benzyl-anilin sulfonates are calculated as dry substance.

Example II: 23.5 parts of victoria-blue B base are fused at water-bath temperature, while continuously stirring, with fifteen parts of a sebacic or oleic acid, whereupon a concentrated aqueous solution of twelve parts of the salts mentioned in Example I is gradually added until the product obtained is soluble in water and in oil.

Example III: Twenty-two parts of rhodamin B base are stirred while heating to form a magma with ten to twelve parts of benzyl-anilin sulfonic acid or of benzyl-toluidin sulfonic acid or of benzyl-xylidin sulfonic acid and water, whereupon fifteen parts of alkali sebate or oleate are added until the product becomes soluble in water and in oil.

From these examples it is apparent that it is immaterial in what condition or order the components are allowed to act upon each other. The process is the same if other dyestuffs or color bases be used. The products thus obtained when mixed with varnishes suited for printing purposes may be at once applied to shade off printing-inks.

Having thus described our invention, we claim as new and desire to secure by Letters Patent—

1. The process herein described for the manufacture of products soluble in water, fats and oils from the sebates and oleates of organic color bases, which consists in combining the sebates and oleates of organic color bases with the alkali salts of sulfonic acids of aromatic benzyl bases.

2. As a new product, the mixture of a dyestuff as a salt insoluble in water with the alkali salt of the sulfonic acid of an aromatic benzyl base, said product being soluble in water, benzene, fats and oils, but insoluble in ether, and specially applicable to shade off printing-inks.

In testimony that we claim the foregoing as our invention we have signed our names in presence of two subscribing witnesses.

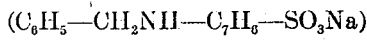
BENNO HOMOLKA.
JOSEF ERBER.

Witnesses:
 JEAN GRUND,
 CARL GRUND.